(12) United States Patent
Wajcer et al.

(10) Patent No.: US 8,730,865 B2
(45) Date of Patent: *May 20, 2014

(54) FRONT-END FOR SATELLITE COMMUNICATION

(75) Inventors: Daniel Wajcer, Beit Yehoshua (IL); Guy Cohen, Herzliya (IL)

(73) Assignee: Novelsat Ltd., Ra'Anana (IL)

(*) Notice: Subject to any disclaimer, the term of this patent is extended or adjusted under 35 U.S.C. 154(b) by 162 days.

This patent is subject to a terminal disclaimer.

(21) Appl. No.: 13/257,981

(22) PCT Filed: Apr. 25, 2010

(86) PCT No.: PCT/IB2010/051811
§ 371 (c)(1),
(2), (4) Date: Sep. 21, 2011

(87) PCT Pub. No.: WO2010/128420
PCT Pub. Date: Nov. 11, 2010

(65) Prior Publication Data
US 2012/0039247 A1    Feb. 16, 2012

Related U.S. Application Data

(60) Provisional application No. 61/176,383, filed on May 7, 2009, provisional application No. 61/175,338, filed on May 4, 2009.

(51) Int. Cl.
*H04B 7/185*    (2006.01)

(52) U.S. Cl.
CPC ........ *H04B 7/18582* (2013.01); *H04B 7/18584* (2013.01); *H04B 7/18508* (2013.01)
USPC ............................ 370/316; 370/328; 370/329

(58) Field of Classification Search
CPC ........... H04B 7/18582; H04B 7/18584; H04B 7/18508; H04B 7/2606
USPC .......................................... 370/316, 328, 329
See application file for complete search history.

(56) References Cited

U.S. PATENT DOCUMENTS 7,337,464 B2    2/2008    Bogot
8,514,966 B2 *  8/2013    Wajcer et al. ................. 375/285

(Continued)

FOREIGN PATENT DOCUMENTS

WO        2010049858 A2    5/2010

OTHER PUBLICATIONS

EN 300 421, version 1.1.2, entitled "Digital Video Broadcasting (DVB); Framing Structure, Channel Coding and Modulation for 11/12 GHz Satellite Services," Aug. 1997.

(Continued)

*Primary Examiner* — Chuong T Ho
(74) *Attorney, Agent, or Firm* — D. Kligler IP Services Ltd.

(57) ABSTRACT

A communication method includes operating a communication unit (60, 124), which demodulates radio signals in accordance with a first air interface and applies at least one upper-layer process to the demodulated signals. A signal is received and demodulated in accordance with a second air interface, different from the first air interface. The demodulated signal is input to the communication unit so as to cause the communication unit to apply the upper-layer process to the signal that was demodulated using the second air interface, while superseding the first air interface.

28 Claims, 7 Drawing Sheets

(56) References Cited

U.S. PATENT DOCUMENTS

| | | | |
|---|---|---|---|
| 2004/0116150 A1* | 6/2004 | Yukie et al. | 455/550.1 |
| 2005/0125839 A1 | 6/2005 | Coman | |
| 2005/0174986 A1* | 8/2005 | Emond et al. | 370/351 |
| 2008/0064323 A1 | 3/2008 | Barda | |
| 2011/0188550 A1* | 8/2011 | Wajcer et al. | 375/214 |

OTHER PUBLICATIONS

EN 301 210, version 1.1.1, entitled "Digital Video Broadcasting (DVB); Framing Structure, Channel Coding and Modulation for Digital Satellite News Gathering (DSNG) and Other Contribution Applications by Satellite," Mar. 1999.

EN 302 307, version 1.1.2, entitled "Digital Video Broadcasting (DVB); Second Generation Framing Structure, Channel Coding and Modulation Systems for Broadcasting, Interactive Services, News Gathering and Other Broadband Satellite Applications," Jun. 2006.

DVB standard EN 302 755, version 1.1.1, entitled "Frame Structure Channel Coding and Modulation for a Second Generation Digital Terrestrial Television Broadcasting System (DVB-T2)," Sep. 2009.

Comtechtv Tierman Video Inc., "TDR4000 DVBS & S2, IP&ASI: Professional Digital Satellite IRD With CI," document TDR4000-Data, revision B, Mar. 20, 2009.

Scopus Video Networks, "IRD-2900 Series Professional Integrated Receiver Decoders", User's Manual, revision 2.5, Jan. 2006.

International Application PCT/IB2010/051811 Search Report dated May 6, 2011.

* cited by examiner

FRONT-END FOR SATELLITE COMMUNICATION

CROSS-REFERENCE TO RELATED APPLICATIONS

This application claims the benefit of U.S. Provisional Patent Application 61/175,338, filed May 4, 2009, and U.S. Provisional Patent Application 61/176,383, filed May 7, 2009, whose disclosures are incorporated herein by reference.

FIELD OF THE INVENTION

The present invention relates generally to communication systems, and particularly to signal modulation and demodulation.

BACKGROUND OF THE INVENTION

Satellite communication systems use a variety of air interfaces. For example, the European Telecommunications Standards Institute (ETSI) specifies Digital Video Broadcasting (DVB) satellite systems in standard EN 300 421, version 1.1.2, entitled "Digital Video Broadcasting (DVB); Framing Structure, Channel Coding and Modulation for 11/12 GHz Satellite Services," August, 1997, in standard EN 301 210, version 1.1.1, entitled "Digital Video Broadcasting (DVB); Framing Structure, Channel Coding and Modulation for Digital Satellite News Gathering (DSNG) and Other Contribution Applications by Satellite," March, 1999, and in standard EN 302 307, version 1.1.2, entitled "Digital Video Broadcasting (DVB); Second Generation Framing Structure, Channel Coding and Modulation Systems for Broadcasting, Interactive Services, News Gathering and Other Broadband Satellite Applications," June, 2006, which are incorporated herein by reference. Air interfaces for terrestrial DVB communication is specified, for example, in DVB standard EN 302 755, version 1.1.1, entitled "Frame Structure Channel Coding and Modulation for a Second Generation Digital Terrestrial Television Broadcasting System (DVB-T2)," September, 2009, which is incorporated herein by reference.

Some communication systems perform conversion from one transmission format to another. For example, U.S. Pat. No. 7,337,464, whose disclosure is incorporated herein by reference, describes a broadcasting system that includes a transmitter, a receiver and a re-formatter. The transmitter is operative to transmit a signal in a first transmission format, the receiver is operative to receive the signal, and the re-formatter is operative to reformat the received signal into a second transmission format. A Set-Top Box (STB) is operative to decode the second-transmission-formatted signal.

Satellite signals are sometimes received and demodulated using Integrated Receiver Decoders (IRDs), which perform both signal demodulation and media (e.g., video) decoding. For example, ComtechTV Tiernan (San Diego, Calif.) offers a family of IRD products called TDR 4000. These products are described in a product sheet entitled "TDR4000 DVBS&S2, IP&ASI Professional Digital Satellite IRD With CI," document TDR4000-DATA, revision B, which is incorporated herein by reference. As another example, Scopus Video Networks (Rosh Ha'Ayin, Israel) offers a line of IRDs called IRD-2900. These products are described in "IRD-2900—Professional Integrated Receiver Decoders," revision 2.5, January, 2006, which is incorporated herein by reference.

SUMMARY OF THE INVENTION

An embodiment of the present invention provides a communication method, including:

operating a communication unit, which demodulates radio signals in accordance with a first air interface and applies at least one upper-layer process to the demodulated signals;

receiving and demodulating a signal in accordance with a second air interface, different from the first air interface; and inputting the demodulated signal to the communication unit so as to cause the communication unit to apply the upper-layer process to the signal that was demodulated using the second air interface while superseding the first air interface.

In some embodiments, the communication unit includes a digital interface, which inputs digital signals for application of the upper-layer process, and inputting the demodulated signal includes sending the demodulated signal to the communication unit over the digital interface, while bypassing demodulation in accordance with the first air interface by the communication unit. In an alternative embodiment, inputting the demodulated signal includes re-modulating the demodulated signal using the first air interface, and providing the re-modulated signal to the communication unit.

In a disclosed embodiment, the communication unit processes data in a transmission upper-layer process and modulates the processed data in accordance with the first air interface, and the method includes receiving the processed data from the communication unit, and modulating the processed data in accordance with the second air interface while superseding the first air interface. In an embodiment, the communication unit includes a digital interface, which outputs digital signals after application of the transmission upper-layer process, and receiving the processed data from the communication unit includes receiving the processed data over the digital interface. In another embodiment, superseding the first air interface includes demodulating the modulated and processed data, which is received from the communication unit, in accordance with the first air interface prior to modulation in accordance with the second air interface. In yet another embodiment, the processed and modulated data is transmitted in accordance with the second air interface to a satellite.

In some embodiments, the upper-layer process includes video decoding. Additionally or alternatively, the upper-layer process may include a Medium Access Control (MAC) process. Further additionally or alternatively, the upper-layer process may include a Internet Protocol (IP) stack process. In an embodiment, the first air interface has a first performance, and the second air interface has a second performance, better than the first performance. In a disclosed embodiment, the first and second performance include at least one performance type selected from a group of types consisting of a spectral efficiency, an error rate and a link budget. In another embodiment, receiving the signal includes receiving the signal from a satellite.

In some embodiments, the second air interface defines transmission of symbols, which are shaped using a given pulse shape, at a symbol rate that is higher than a Nyquist rate defined for the given pulse shape. In some embodiments, the second air interface defines encoding of data using a Low Density Parity Check (LDPC) code, and decoding of the LDPC code in an iterative process that applies internal iterations for computing output metrics based on input metrics, and external iterations that modify the input metrics based on the output metrics. In an embodiment, operating the communication unit includes operating multiple communication units in parallel, and inputting the demodulated signal includes providing the demodulated signal to the multiple communication units.

There is additionally provided, in accordance with an embodiment of the present invention, a communication apparatus, including:

an interface for connecting to a communication unit, which demodulates radio signals in accordance with a first air interface and applies at least one upper-layer process to the demodulated signals; and front-end circuitry, which is configured to receive and demodulate a signal in accordance with a second air interface, different from the first air interface, and to input the demodulated signal to the communication unit via the interface so as to cause the communication unit to apply the upper-layer process to the signal that was demodulated using the second air interface while superseding the first air interface.

The present invention will be more fully understood from the following detailed description of the embodiments thereof, taken together with the drawings in which:

DETAILED DESCRIPTION OF EMBODIMENTS

Overview

Some satellite communication systems use integrated communication units, which perform both physical-layer and upper-layer processing in a single unit. For example, some satellite receivers comprise Integrated Receiver Decoders (IRDs), which perform physical-layer reception (and in particular signal demodulation) and upper-layer processing (e.g., video decoding). Some bidirectional satellite communication systems comprise integrated modem units, which perform physical-layer and upper-layer processing for both transmission and reception. Physical-layer processing in such integrated communication units often complies with a certain standard air interface, such as Digital Video Broadcasting—Satellite (DVB-S), Digital Video Broadcasting—Digital Satellite News Gathering (DVB-DSNG) or DVB-S2.

Embodiments of the present invention that are described herein provide improved satellite communication system configurations and associated methods. These techniques enable a communication system comprising an integrated communication unit to use a different air interface (different physical-layer processing) from the one supported by the integrated communication unit. The change of air interface is performed while retaining the upper-layer processing functionality of the integrated communication unit. In some embodiments, the disclosed techniques are used for upgrading a communication system from a legacy air interface to an improved air interface. The upgrade is performed without having to replace the system's IRDs or integrated modems.

Several example system configurations, which supersede the legacy air interface with the improved air interface, are described herein. Conversion between the two air interfaces is typically performed by a front-end, which interfaces with the integrated communication unit. In some embodiments, a single front-end performs air interface conversion for multiple integrated communication units (e.g., multiple IRDs).

Typically, the integrated communication unit comprises a physical-layer processor that performs legacy physical-layer processing, and an upper-layer processor. Some integrated communication units have a digital interface that connects directly to the upper-layer processor. In some embodiments of the present invention that operate in conjunction with such integrated communication units, the front-end performs physical-layer processing in accordance with the improved air interface, and connects to the upper-layer processor of the integrated communication unit via the digital interface. Thus, the legacy physical-layer processor of the integrated communication unit is bypassed.

In alternative embodiments, the front-end comprises physical-layer processors for both the legacy and the improved air interfaces, connected back-to-back. In these embodiments, the front-end interfaces with the integrated communication unit using analog interfaces, without bypassing the unit's physical-layer processor. Nevertheless, the performance of this system configuration is dictated by the improved air interface, because the legacy air interface is used only over a cable connection between the front-end and the integrated communication unit.

The methods and systems described herein enable legacy communication systems to deploy improved-performance air interfaces with minimal hardware modification and minimal impact on existing equipment. As a result, system performance (e.g., spectral efficiency or and/or communication quality) can be improved with minimal investment and effort. The disclosed techniques also enable deployment of proprietary air interfaces, without having to redefine existing physical layer specifications or standards.

System Description

Figure 1:
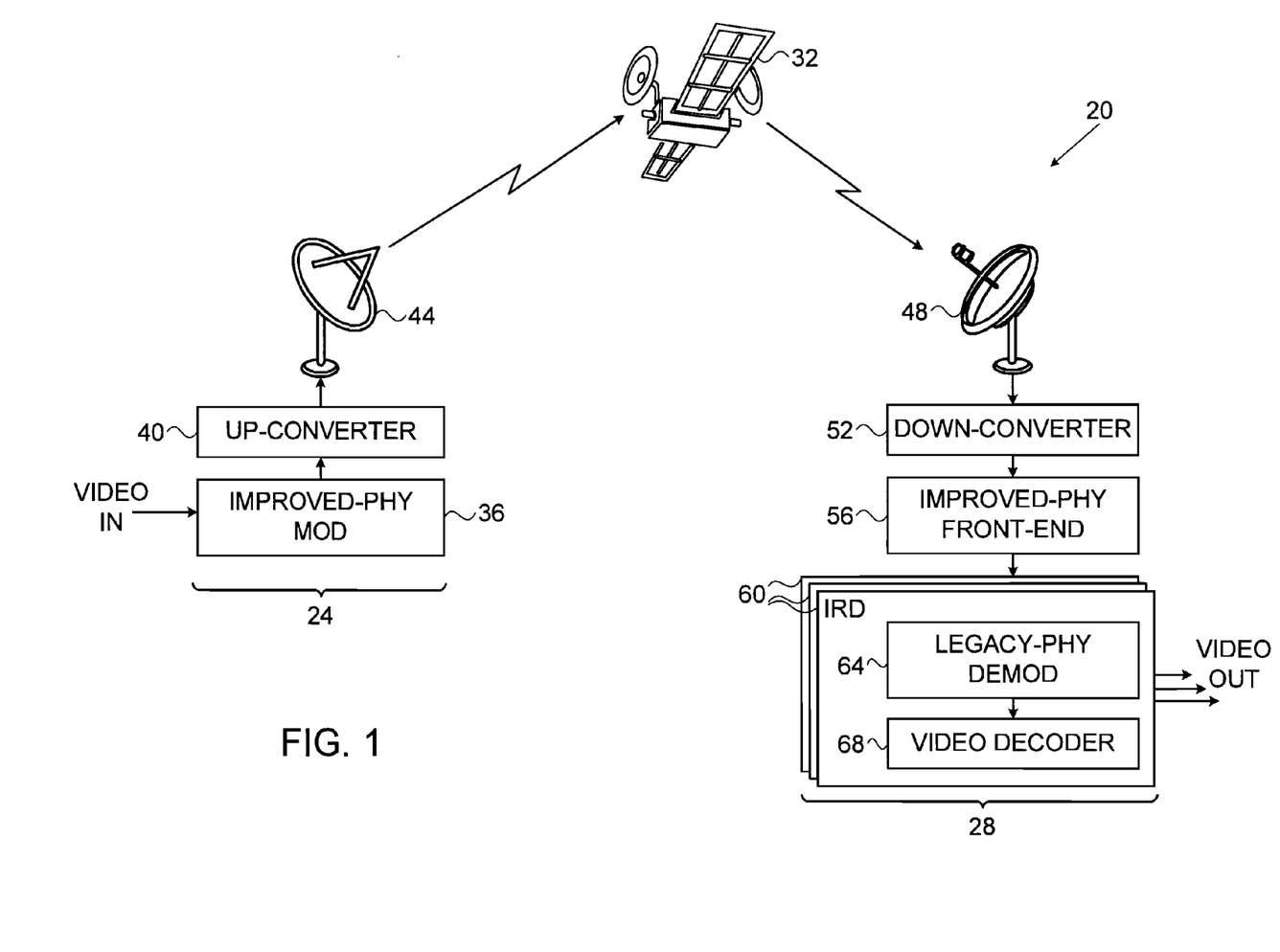
FIG. 1 is a block diagram that schematically illustrates a satellite communication system, in accordance with an embodiment of the present invention.

FIG. 1 is a block diagram that schematically illustrates a satellite communication system 20, in accordance with an embodiment of the present invention. In the present embodiment, system 20 comprises a transmitter 24, which transmits signals to a receiver 28 via a satellite 32. Although FIG. 1 shows a single receiver 28 for the sake of clarity, real-life system configurations typically comprise multiple receivers 28.

System 20 transmits and receives signals in accordance with a certain air interface. The term "air interface" refers to the physical-layer protocol that is used for encoding, modulating and transmitting the signals from the transmitter to the receiver. In particular, the air interface typically defines the pulse shape, modulation scheme, Forward Error Correction (FEC), channel multiplexing scheme and radio channel structure of the signal. The terms "air interface," "physical layer" and "PHY" are used interchangeably herein.

In the present example, system 20 comprises a legacy communication system that was upgraded to support a higher-performance air interface. At least some of the system components were originally designed to support a certain air interface, which is referred to herein as a legacy air interface or legacy PHY. The system was upgraded to support a higher-performance air interface, which is referred to herein as an improved air interface or improved PHY.

The legacy air interface may comply, for example, with the Digital Video Broadcasting—Satellite (DVB-S), Digital Video Broadcasting—Digital Satellite News Gathering (DVB-DSNG), or DVB-S2 specification. These examples of air interfaces are described in ETSI standards EN 300 421 (DVB-S), EN 301 210 (DVB-DSNG) and EN 302 307 (DVB-S2), cited above. Alternatively, the legacy air interface may comprise any other suitable air interface, such as the terrestrial air interface specified in ETSI standard EN 302 755 (DVB-T2), cited above.

The improved air interface may differ from the legacy air interface in any suitable property that provides improved performance. For example, the improved air interface may use a higher-order modulation scheme, a stronger error correction scheme and/or denser channel spacing with respect to the legacy air interface. As another example, the improved air interface may use a different pulse shape (e.g., a lower roll-off factor) than the legacy air interface. Additionally or alternatively, the improved air interface may employ other mechanisms, such as non-linear pre-distortion or constellation shaping, which are not used or used differently in the legacy air interface. Pre-distortion may involve, for example, data pre-distortion at the symbol rate, or signal pre-distortion at a sampling rate that is higher than the symbol rate, followed by low-pass filtering for removing out-of-band products. Constellation shaping may involve, for example, the use of constellation symbols having unequal symbol probabilities. The improved air interface may provide higher spectral efficiency, higher link margin, lower error rate and/or any other suitable performance improvement relative to the legacy air interface.

In an example embodiment, the improved air interface uses Faster-than-Nyquist (FTN) signaling, which transmits a sequence of pulse-shaped symbols at a symbol rate that is higher than the Nyquist rate defined for the pulse shape being used. Transmission schemes of this sort typically provide improved spectral efficiency. Certain aspects of FTN transmission and reception in satellite systems are described, for example, in PCT Application PCT/IB2009/054672, which is assigned to the assignee of the present patent application and whose disclosure is incorporated herein by reference.

In another example embodiment, the improved air interface uses an improved Low Density Parity Check (LDPC) code. In yet another example embodiment, the improved air interface is achieved by the use of an improved demodulator and decoder. One example may be a LDPC decoder that applies an iterative process with both internal iterations that compute output metrics based on input metrics, and external iterations that modify the input metrics based on the output metrics.

In the example configuration of FIG. 1, system 20 comprises a video distribution system that distributes video media to receivers 28. Transmitter 24 comprises an improved-PHY modulator 36, which accepts input video for transmission and modulates it according to the improved air interface. Modulator 36 produces a low-frequency signal (e.g., at baseband or Intermediate Frequency—IF) that complies with the improved air interface. An up-converter 40 up-converts the signal to Radio Frequency (RF). A transmit antenna 44 transmits the RF signal toward satellite 32. Satellite 32 re-transmits the RF signal toward receivers 28. The signal transmitted from transmitter 24 thus complies with the improved air interface.

In a given receiver 28, a receive antenna 48 receives the RF signal from the satellite. A down-converter 52 down-converts the RF signal to low frequency, e.g., to baseband or IF. The signal is then processed by an improved-PHY front-end 56, whose functionality and structure will be explained in detail further below. Example configurations of the improved-PHY front-end are shown in FIGS. 2-5 below. The output of front-end 56 is provided to one or more Integrated Receiver Decoders (IRDs) 60.

Each IRD performs both physical-layer processing and upper-layer processing on a respective video stream. Physical-layer processing comprises, for example, signal demodulation. Upper-layer processing comprises, for example, video or other media decoding. In a typical embodiment, transmitter 24 transmits compressed video, e.g., using Motion Picture Experts Group (MPEG) compression. In these embodiments, each IRD 60 demodulates the radio signal received on a given communication channel (carrier), and applies MPEG decoding so as to extract a given video stream from the demodulated signal. The decoded video streams produced by IRDs 60 are provided as output.

In some configurations, two or more IRDs decode different video streams that are transmitted over the same carrier. In these scenarios, the demodulation function is typically duplicated in each of the IRDs. When using MPEG video coding, each carrier typically carries multiple interleaved streams of MPEG packets, each stream identified by a respective header. Typically, each IRD is assigned to decode a particular MPEG stream. The IRD typically extracts the packets of its designated stream according to the header.

In the embodiment of FIG. 1, IRDs 60 are legacy IRDs, which comply with the legacy air interface. In other words, each IRD 60 performs a physical-layer reception process (e.g., signal demodulation) in accordance with the legacy air interface, and then performs media decoding (e.g., video decompression). In some embodiments, IRDs 60 may comprise DVB-S, DVB-DSNG and/or DVB-S2 IRDs, such as the TDR4000 and IRD-2900 IRDs, cited above. Each IRD 60 comprises a legacy-PHY demodulator 64 and a video decoder 68. Demodulator 64 performs physical-layer reception according to the legacy air interface, so as to produce one or more streams of compressed video. Decoder 68 applies video decoding to a given compressed video stream, so as to produce and output a respective decompressed video stream. Legacy-PHY demodulator 64 is sometimes referred to herein as a physical-layer processor, and video decoder 68 is sometimes referred to herein as an upper-layer processor.

As noted above, the signals that are transmitted by transmitter 24 comply with the improved air interface. IRDs 60, on the other hand, comply with the legacy air interface. Mediation between the legacy and improved air interfaces is carried out by improved-PHY front-end 56. Front-end 56 performs physical-layer reception (e.g., demodulation) in accordance with the improved air interface. Front-end 56 then provides the demodulated signal to IRDs 60 in a way that causes the IRDs to perform upped-layer processing (in the present example video decoding) while superseding the legacy air interface with the improved air interface.

Several example front-end configurations, which supersede the legacy air interface with the improved air interface, are shown and explained below. The term "supersede" refers to any scheme that causes the performance of system 20 to be derived from the improved air interface and not from the legacy air interface. In some embodiments, the legacy-PHY demodulators in the IRDs are bypassed. In alternative embodiments, however, the received signal is processed by both the improved-PHY and the legacy-PHY demodulators. Nevertheless, the system performance is not limited by the performance of the legacy-PHY demodulators, and therefore the legacy air interface is effectively superseded by the improved air interface.

The example system configuration shown in FIG. 1 is chosen purely for the sake of conceptual clarity. In alternative embodiments, any other suitable system configuration can also be used. For example, system 20 in FIG. 1 performs unidirectional transmission. In alternative embodiments, the system may perform bidirectional communication among communication terminals via satellite 32. A configuration of this sort is addressed in FIGS. 4 and 5 below.

In the example of FIG. 1, transmitter 24 comprises an improved-PHY modulator that drives an up-converter. The transmitter typically comprises a video encoder (e.g., MPEG encoder, not shown in the figure), which provides encoded (compressed) video as input to the improved-PHY modulator. In alternative embodiments, the transmitter may comprise a legacy-PHY modulator, which includes the video encoding functionality. In these configurations, the video encoding functions of the legacy-PHY modulator are retained, but its modulation functions are bypassed. In alternative embodiments, the improved-PHY modulator can be integrated with the up-converter in a single unit. This unit may replace the legacy-PHY modulator and up-converter, or replace only the up-converter and use the video encoding functions of the legacy-PHY modulator.

In the example of FIG. 1, the improved-PHY front-end is installed between the down-converter and the legacy IRDs. In alternative embodiments, the improved-PHY front-end can be integrated with one or more IRDs in a single unit. Further alternatively, the improved-PHY front-end may be integrated with the down-converter in a single unit, e.g., replace a legacy down-converter. Further alternatively, the improved-PHY front-end may be integrated with both the down-converter and one or more IRDs in a single unit. This configuration functions as a self-contained down-converter and IRD stack, operating in accordance with the improved air interface.

In alternative embodiments, instead of serving IRDs 60 in a satellite application, front-end 56 can perform air interface conversion for one or more Digital Terrestrial Television (DTTV) receivers (not shown in the figures) in a terrestrial communication system.

Example Improved-PHY Front-End Configurations

Figure 2:
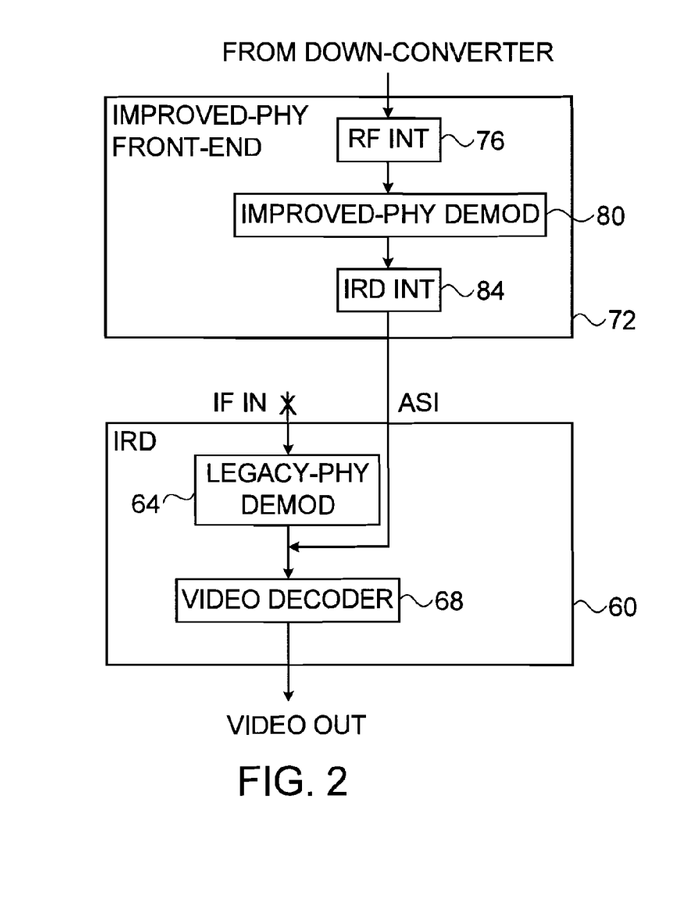
FIGS. 2 and 3 are block diagrams that schematically illustrate satellite receivers, in accordance with embodiments of the present invention.

FIG. 2 is a block diagram that schematically illustrates a satellite receiver, in accordance with an embodiment of the present invention. In this configuration, the receiver comprises an improved-PHY front-end 72, which demodulates the received signal according to the improved air interface and produces a digital output signal that is ready for video decoding.

Front-end 72 comprises an RF interface 76, an improved-PHY demodulator 80 and an IRD interface 84. The RF interface receives the down-converted signal from down-converter 52. Improved-PHY demodulator 80 demodulates the received signal according to the improved air interface, so as to produce the digital output signal. IRD interface 84 provides the digital output signal to IRD 60.

In this embodiment, IRD 60 comprises a digital input interface that bypasses legacy-PHY demodulator 64 and enters video decoder 68 directly. IRD interface 84 is connected to this digital input interface, so as to provide the digital output signal from front-end 72 directly to video decoder 68 in the IRD. IRD 60 also comprises an IF input interface, which enters legacy-PHY demodulator 68. In the configuration of FIG. 2, however, this IF interface is not used, and the legacy-PHY demodulator is bypassed.

The digital input interface of IRD 60 (the digital interface between front-end 72 and IRD 60) may comply with any suitable standard or protocol. In some embodiments, the interface uses the Asynchronous Serial Interface (ASI) protocol. Alternatively, the interface may comprise a G.703 interface, an Internet Protocol (IP) interface such as Ethernet, or any other suitable interface type.

Figure 3:
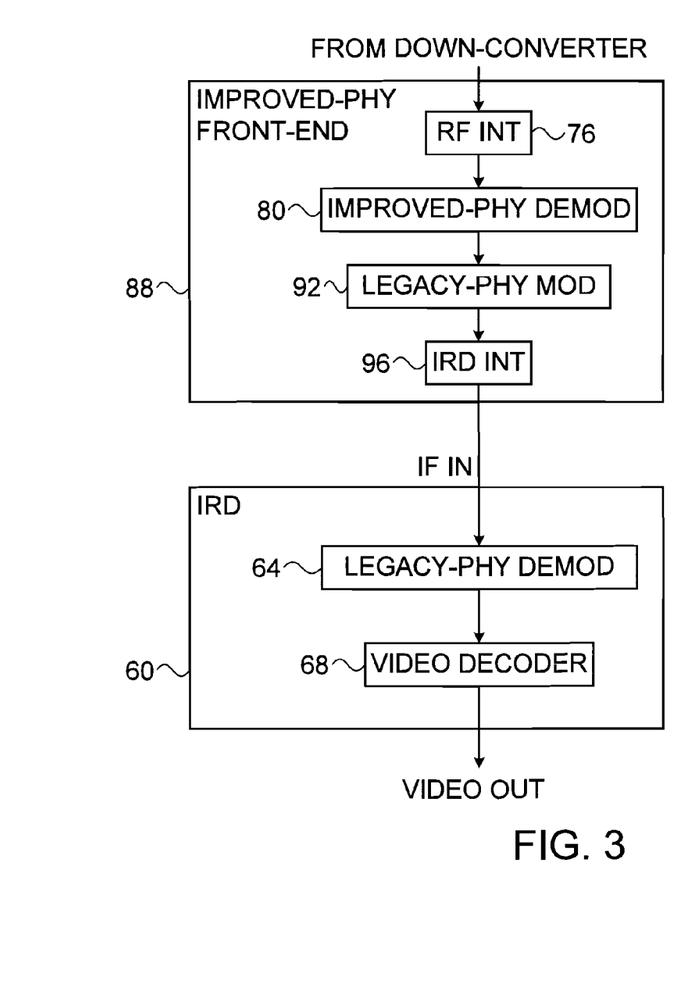

FIG. 3 is a block diagram that schematically illustrates an alternative satellite receiver configuration, in accordance with another embodiment of the present invention. In this configuration, an improved-PHY front-end 88 demodulates the received signal according to the improved air interface, and then re-modulates the demodulated signal in accordance with the legacy air interface. The re-modulated signal is provided to IRD 60 using its IF input interface. In this configuration, the legacy-PHY demodulator of the IRD is not bypassed. This sort of configuration can be used, for example, with IRDs that do not support a digital input interface.

Front-end 88 of FIG. 3 comprises an RF interface 76, which receives the down-converted signal from down-converter 52. An improved-PHY demodulator 80 demodulates the received signal in accordance with the improved air interface, so as to produce a digital signal. A legacy-PHY modulator 92 re-modulates the digital signal in accordance with the legacy air interface, to produce an IF signal. The IF signal is then provided to the IF input interface of IRD 60.

In the configuration of FIG. 3, IRD 60 is provided with an IF signal that conforms to the legacy air interface, even though the signal transmitted over the air complies with the improved air interface. Transmission using the legacy air interface is performed only over the cable connection between front-end 88 and IRD 60, i.e., over a clean channel with little or no noise or distortion. Transmission over this cable connection may be carried out using a wide carrier, since there are no adjacent carriers or other spectrum limitation over the cable. As a result, the system performance is determined by the improved air interface, and is not compromised by the performance of the legacy air interface. In other words, the legacy air interface is superseded by the improved air interface, even though some system elements continue to operate in accordance with the legacy air interface.

Bidirectional Satellite Link Configurations

The embodiments described above involve unidirectional communication from a transmitter to one or more receivers, such as in video distribution applications. Some satellite communication applications, however, involve bidirectional communication between communication terminals. Bidirectional communication is carried out, for example, by Very Small Aperture Terminals (VSATs), e.g., for telephony and internet access applications. In some embodiments of the present invention, the improved-PHY front-ends described herein are used to implement high-performance bidirectional communication systems.

Figure 4:
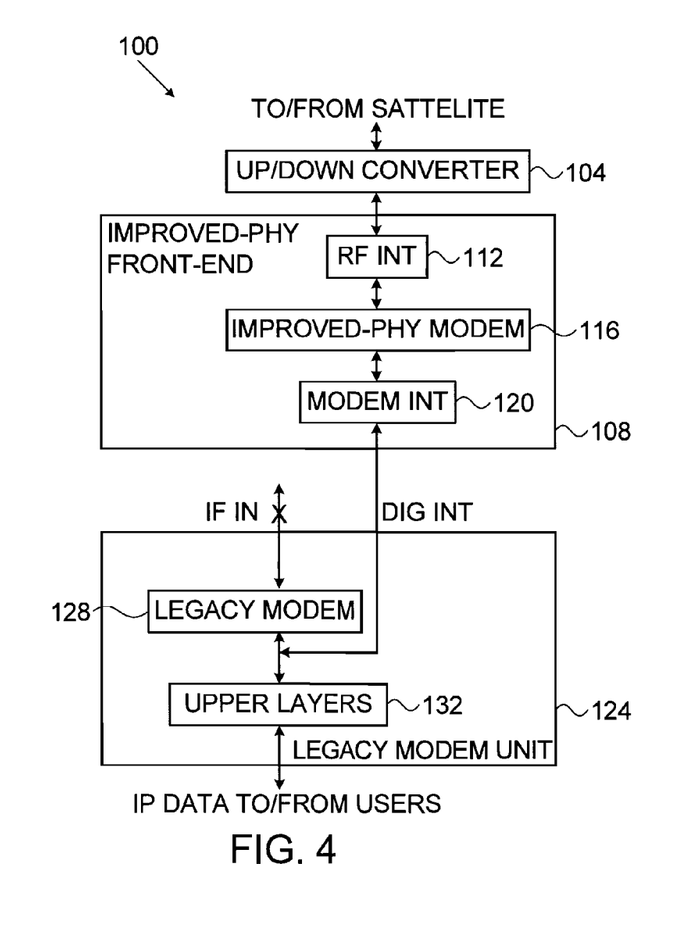
FIGS. 4 and 5 are block diagrams that schematically illustrate satellite transceivers, in accordance with embodiments of the present invention.

FIG. 4 is a block diagram that schematically illustrates a satellite transceiver 100, in accordance with an embodiment of the present invention. Transceivers of this sort can carry out bidirectional communication with one another via satellite 32. As in the unidirectional applications described above, some of the elements of transceiver 100 are originally designed to operate according to a legacy air interface (e.g., DVB-S, DVB-DSNG or DVB-S2), and the transceiver is upgraded to comply with a higher-performance air interface.

Transceiver 100 comprises an up/down-converter 104, which receives RF signals from satellite 32 and transmits RF signals to the satellite via an antenna (not shown in the figure). The RF signals that are transmitted via the satellite comply with the improved air interface. The transceiver, on the other hand, comprises a legacy modem unit 124, which complies with the legacy air interface. The legacy modem unit comprises a legacy modem 128, which carries out physical-layer transmission and reception processing in accordance with the legacy air interface. Legacy modem 128 is sometimes referred to herein as a physical-layer processor. The legacy modem unit also comprises an upper-layer processor 132, which carries out upper-layer transmission and reception processing. The term "upper-layer process" refers to any processing that is associated with a layer higher than the physical layer. With reference to the well-known Open Systems Interconnect (OSI) model, an upper-layer process refers to any process that is associated with layer-2 or higher. Upper-layer processing may comprise, for example, Medium Access Control (MAC), IP protocol stack functions, and/or any other suitable process.

Transceiver 100 comprises an improved-PHY front-end 108, which converts between the improved air interface (used for communicating via the satellite) and the legacy air interface (supported by the transceiver's legacy modem unit). Front-end 108 comprises an RF interface, which exchanges analog signals with up/down converter 104. An improved-PHY modem 116 performs physical-layer transmission and reception processing (and in particular signal modulation and demodulation) in accordance with the improved air interface. A modem interface 120 exchanges data with legacy modem unit 124. In the example of FIG. 4, legacy modem unit 124 supports a digital interface, which bypasses legacy modem 128 and connects directly to upper-layer processor 132.

On reception, up/down-converter 104 down-converts the RF signal received from the satellite. Front-end 108 applies physical-layer reception processing (e.g., demodulation) to the down-converted signal, according to the improved air interface. The front-end thus produces a digital signal that is ready for upper-layer processing. The digital signal is provided to upper-layer processor 132 in legacy modem unit 124 via the digital interface, thereby bypassing legacy modem 128. Processor 132 applies upper-layer reception processing to the digital signal, so as to produce user data.

On transmission, user data is provided to legacy modem unit 124. Processor 132 applies upper-layer transmission processing to the data, and the resulting signal is sent to front-end 108 over the digital interface. Improved-PHY modem 116 in front-end 108 applies physical-layer transmission processing (e.g., modulation) according to the improved air interface. Modem 116 produces an analog (e.g., baseband or IF) signal conforming to the improved air interface. Up/down-converter 104 up-converts this signal to RF, and transmits the RF signal via the antenna toward satellite 32.

Figure 5:
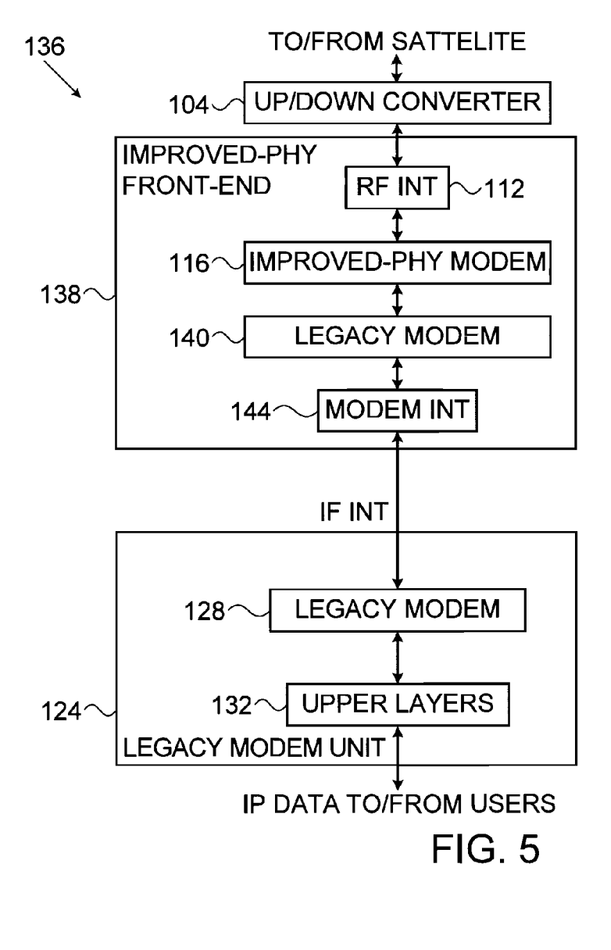

FIG. 5 is a block diagram that schematically illustrates a satellite transceiver 136, in accordance with an alternative embodiment of the present invention. In this embodiment, the legacy modem in unit 124 is not bypassed. Instead, the improved-PHY front-end applies physical-layer processing using both the legacy air interface and the improved air interface in cascade, and interfaces with the legacy modem unit using the unit's IF interface.

Transceiver 136 comprises an improved-PHY front-end 138, which comprises an RF interface 112, an improved-PHY modem 116, a legacy modem 140, and a modem interface 144. On reception, up/down-converter 104 down-converts the RF signal received from the satellite. Improved-PHY modem 116 first applies physical-layer reception processing (e.g., demodulation) to the down-converted signal, according to the improved air interface. Modem 116 produces a digital signal that is provided to legacy modem 140. Modem 140 applies physical-layer transmission processing according to the legacy air interface, and in particular re-modulates the signal. Modem 140 thus produces an analog (e.g., baseband of IF) signal that conforms to the legacy air interface. The IF signal is provided to legacy modem unit 124 via its IF interface, and is processed by legacy modem 128 and upper-layer processor 132.

On transmission, user data is provided to legacy modem unit 124. Processor 132 applies upper-layer transmission processing to the data, and legacy modem 128 applies physical-layer transmission processing. Unit 124 thus produces an IF signal conforming to the legacy air interface. The IF signal is provided to front-end 138 via the IF interface of unit 124. In front-end 138, legacy modem 140 applies physical-layer reception processing to the IF signal according to the legacy air interface, and in particular demodulates the signal. Modem 140 produces a digital signal that is provided to improved-PHY modem 116. Modem 116 applies physical-layer transmission processing (and in particular re-modulates the signal) according to the improved air interface. Modem 116 thus produces an analog (e.g., baseband or IF) signal conforming to the improved air interface. The analog signal is up-converted to RF by up/down-converter 104, and then transmitted toward satellite 32.

Figure 6:
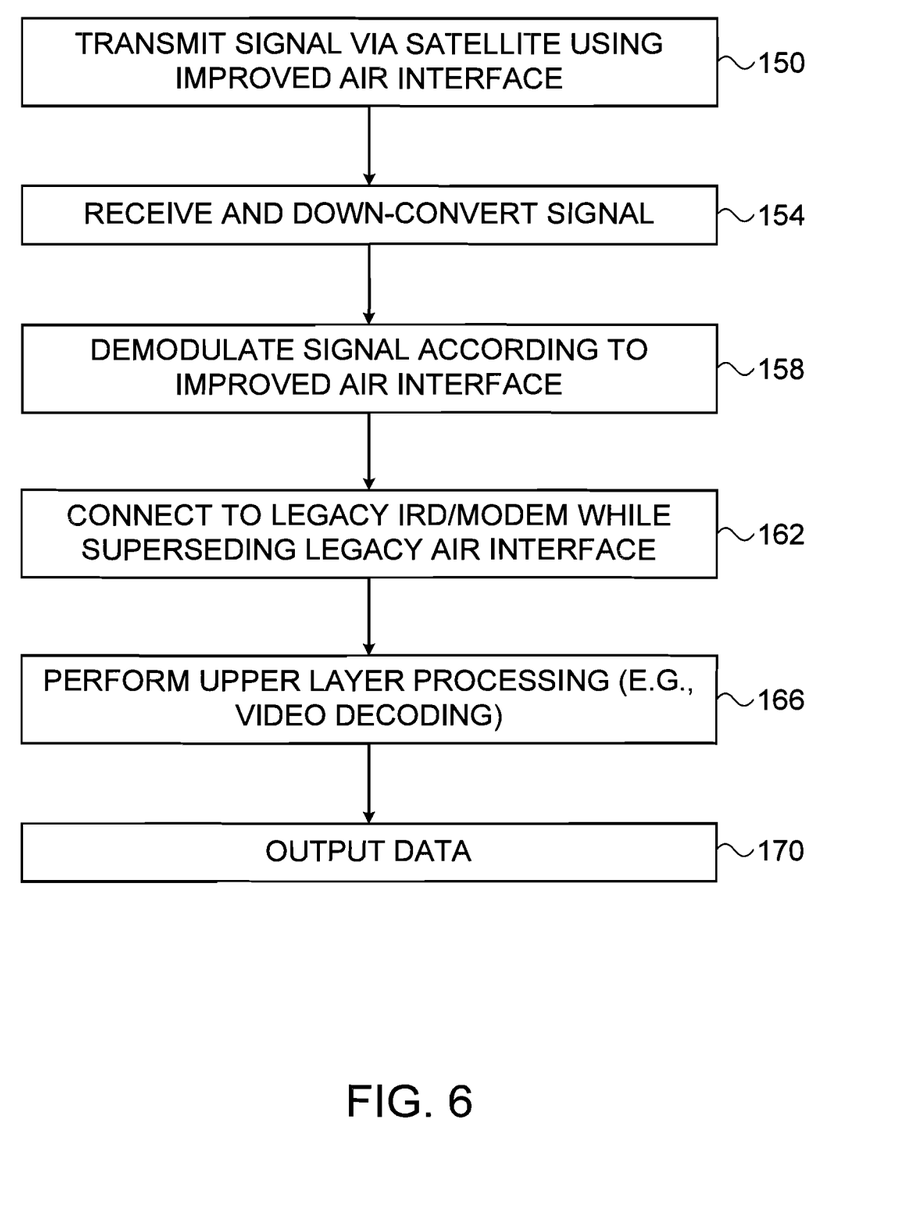
FIG. 6 is a flow chart that schematically illustrates a method for satellite communication, in accordance with an embodiment of the present invention.

FIG. 6 is a flow chart that schematically illustrates a method for satellite communication, in accordance with an embodiment of the present invention. The method refers mainly to the reception processing performed in receiver 28 of FIG. 1 above, in order to demonstrate the disclosed techniques. Similar processes can be described for bidirectional transmission and reception using the transceivers of FIGS. 4 and 5.

The method of FIG. 6 begins with transmitter 24 transmitting a RF signal via satellite 32 using the improved air interface, at a transmission step 150. Down-converter 52 in receiver 28 receives and down-converts the RF signal, at a down-conversion step 154. Improved-PHY front-end 56 demodulates the signal according to the improved air interface, at a demodulation step 158.

Front-end 56 provides the demodulated signal to IRD 60 while superseding the legacy air interface, at a superseding step 162. In some embodiments, the improved-PHY front-end interfaces directly with video decoder 68 in the IRD using a digital interface (for example using the configuration of FIG. 2). In alternative embodiments, the improved-PHY front-end interfaces with the IRD using the IRD's IF interface (for example using the configuration of FIG. 3). In either case, the legacy air interface is superseded by the improved air interface. Video decoder 68 in IRD 60 applies upper-layer processing (in the present example video decoding) to the signal, at an upper-layer processing step 166. The resulting data (in the present example decompressed video) is provided as output, at an output step 170.

Example Improved-PHY Modulator and Demodulator Configurations

The following description demonstrates several example configurations of modulators and demodulators, which can be used to implement the various improved-PHY modulators and demodulators of FIGS. 1-5 above. The modulator configurations described below can be used to implement the modulator functions in the improved-PHY modems of FIGS. 4-5 above. The demodulator configurations described below can be used to implement the demodulator functions in the improved-PHY modems of FIGS. 4-5 above.

Figure 7:
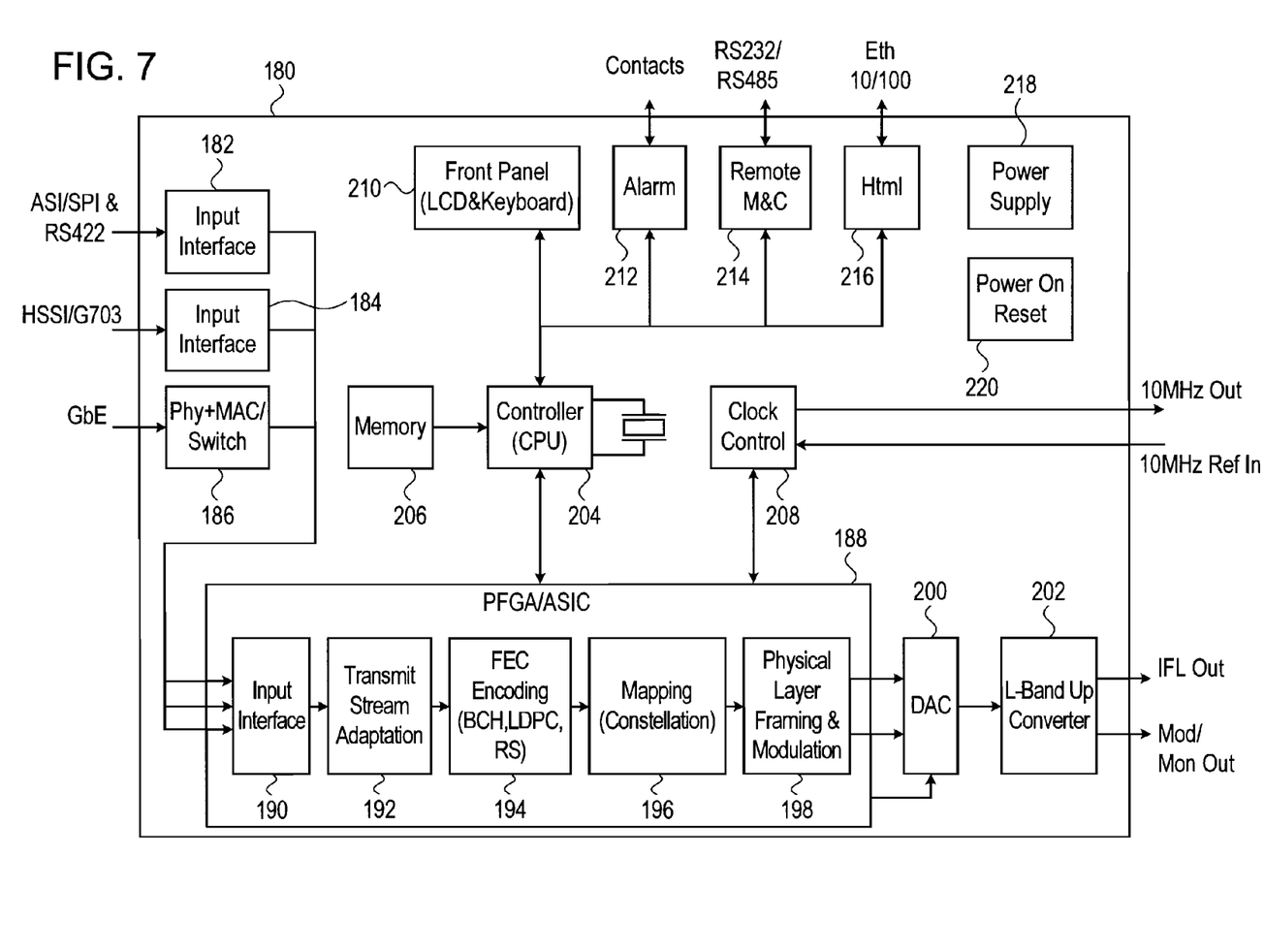
FIGS. 7 and 8 are block diagrams that schematically illustrate a modulator, in accordance with an embodiment of the present invention.

FIG. 7 is a block diagram that schematically illustrates a modulator 180, in accordance with an embodiment of the present invention. Modulator 180 comprises one or more input interfaces, in the present example an ASI/SPI and RS422 interface 182, an HSSI/G.703 interface 184, and a Gigabit Ethernet (GbE) PHY/MAC switch 186. Input data for modulation is provided via the input interfaces to a modulator block 188.

Block 188 typically comprises an Application-Specific Integrated Circuit (ASIC) or Field-Programmable Gate Array (FPGA). Block 188 comprises an input interface 190 for receiving the data from interfaces 182-186. A transmit stream adaptation module 192 provides padding to complete a base-band frame and base-band scrambling. A FEC encoder 194 encodes the data with a FEC, e.g., a Reed-Solomon (RS), Bose-Chaudhuri-Hocquenghem (BCH), LDPC code or a combination of such codes. A mapper 196 maps the encoded data onto a stream of modulation symbols that are drawn from a certain symbol constellation. A framer 198 arranges the modulated symbols in frames, and adds headers and pilot symbols according to the applicable air interface. A Digital-to-Analog Converter (DAC) 200 converts the digital output of block 188 into an analog signal. An up-converter 202 up-converts the signal to IF.

A controller 204 controls the operation of modulator 180. Controller 204 uses a memory 206 for storing program instructions and data. Modulator block 188 receives one or more clock signals from a clock control module 208, which in the present example receives an external 10 MHz clock reference. Module 208 may also output a reference clock that can be used to drive other external components. Modulator 180 also comprises a front panel 210 with suitable input and output controls (e.g., display and/or keyboard), an alarm module 212, a remote maintenance and control interface 214, and an Ethernet interface 216. A power supply 218 provides electrical power to the modulator. The modulator also comprises a power-on reset circuit 220.

Figure 8:
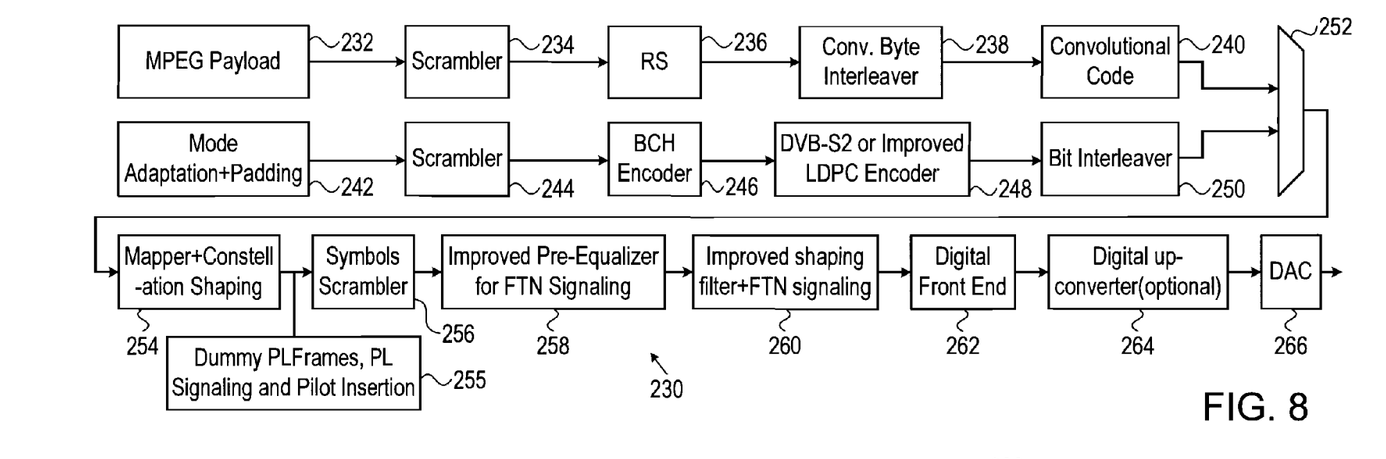

FIG. 8 is a block diagram that schematically illustrates functional blocks of a modulator 230, in accordance with an embodiment of the present invention. The functional flow of FIG. 8 can be implemented, for example, using the hardware configuration of FIG. 7 above. Modulator 230 transmits MPEG-encoded video and associated control information. The modulator comprises two processing chains. One chain is used when operating in a DVB-S legacy compatible mode. The other chain is used when operating either in a DVB-S2 legacy compatible mode, or in an improved air-interface mode.

In the first chain, an MPEG payload 232 is scrambled by a scrambler 234. A Reed-Solomon (RS) encoder 236 encodes the scrambled data with a RS FEC code. A convolutional byte interleaver interleaves the encoded data. A convolutional encoder 240 encodes the interleaved data with a convolutional FEC code. In the second chain, control information (e.g., mode adaptation information) is scrambled by a scrambler 244. A BCH encoder 246 encodes the scrambled control information with a BCH FEC code. An LDPC encoder 248 encodes the control information with an LDPC code (e.g., an LDPC code that is compatible with the DVB-S2 air interface or an improved LDPC code). A bit interleaver interleaves the control information. A multiplexer 252 multiplexes the outputs of the two chains into a single bit stream.

A mapper/shaper 254 maps the bit stream onto a sequence of modulated symbols drawn from a certain symbol constellation, and applies constellation shaping. A pilot insertion module 255 inserts header and pilot symbols for synchronization into the symbol sequence. Module 255 may add dummy frames when there is no input information to transmit. A symbol scrambler 256 scrambles the symbol sequence. A pre-equalizer 258 pre-equalizes the symbol sequence, as appropriate for FTN signaling or for channel compensation. A shaping filter 260 shapes the symbols, as appropriate for FTN signaling. A digital front-end 262 up-samples the signal to the required sampling rate. Further aspects of FTN signaling and the associated processing are addressed in PCT Application PCT/IB2009/054672, cited above.

A digital up-converter 264 up-converts the digital signal from baseband to digital IF. A DAC 266 converts the digital signal to an analog signal. In some embodiments, DAC 266 (typically a pair of converter devices) operates on a baseband signal, and digital up-converter 264 is omitted.

Figure 9:
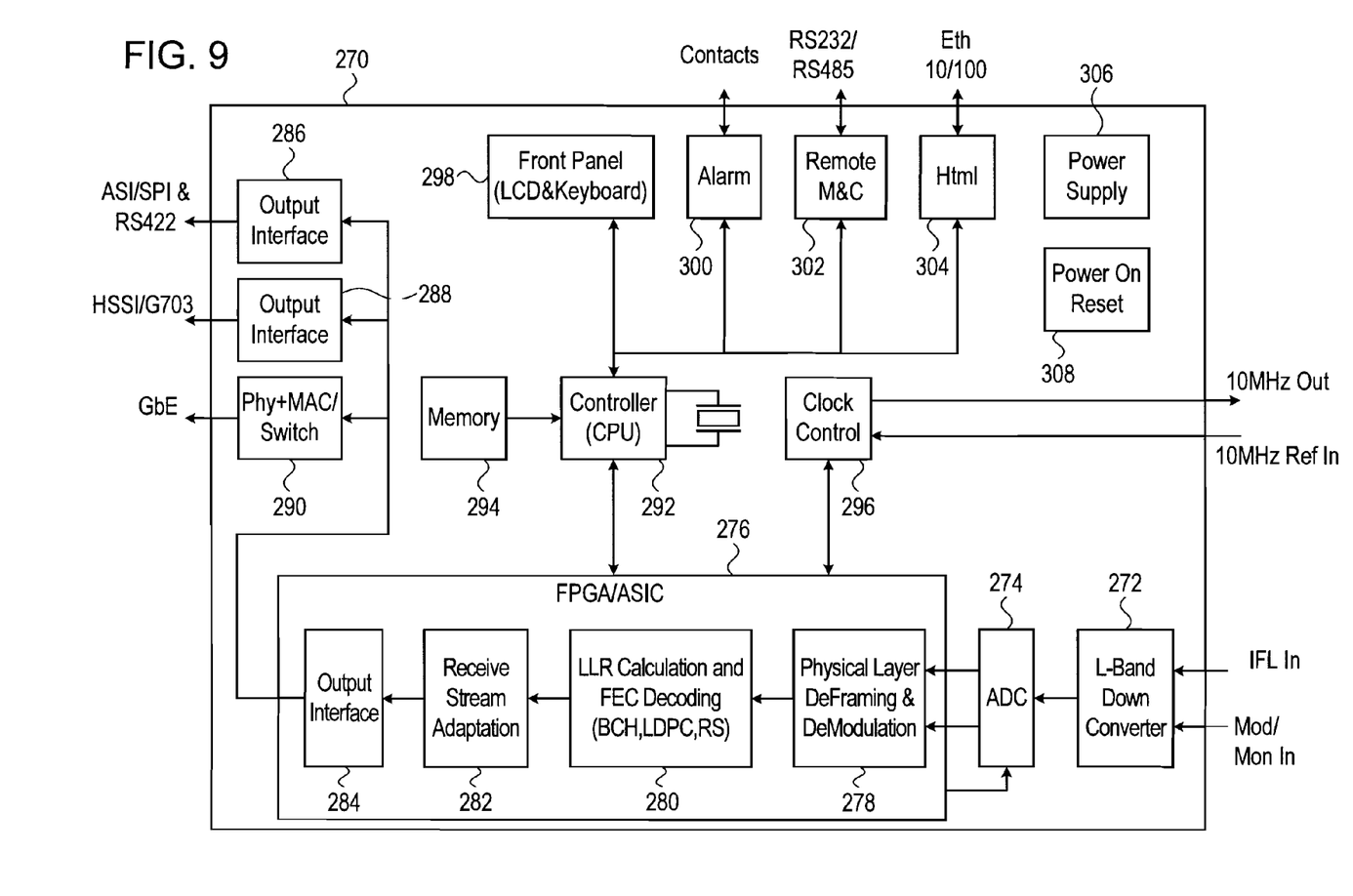
FIGS. 9 and 10 are block diagrams that schematically illustrate a demodulator, in accordance with an embodiment of the present invention.

FIG. 9 is a block diagram that schematically illustrates a demodulator 270, in accordance with an embodiment of the present invention. This demodulator can be used, for example, to demodulate signals that are produced by modulator 180 of FIG. 7 above. Demodulator 270 comprises a down-converter 272, which receives an IF signal and down-converts it. An Analog-to-Digital Converter (ADC) 274 digitizes the down-converted signal. The digitized signal is processed by a demodulator block 276, typically comprising an ASIC or FPGA.

Block 276 comprises a de-framer 278, which de-frames the frames according to the applicable air interface, so as to extract a stream of bits for demodulation. A FEC decoder 280 decodes the FEC applied by encoder 194 of FIG. 7, e.g., RS, BCH or LDPC. In some embodiments, decoder 280 computes soft metrics, such as Log-Likelihood Ratios (LLRs) of the received bits, and decodes the FEC using these metrics. A receive stream adaptation module 282 adapts the rate of the resulting bit stream. An output interface outputs the demodulated bits. Demodulator 270 comprises one or more output interfaces, in the present example an ASI/SPI and RS422 interface 286, an HSSI/G.703 interface 288, and a GbE PHY/MAC switch 290.

A controller 292 controls the operation of demodulator 270. Controller 292 uses a memory 294 for storing program instructions and data. Demodulator block 276 receives one or more clock signals from a clock control module 296, which in the present example receives an external 10 MHz clock reference. Demodulator 270 also comprises a front panel 298 with suitable input and output controls (e.g., display and/or keyboard), an alarm module 300, a remote maintenance and control interface 302, and an Ethernet interface 304. A power supply 306 provides electrical power to the demodulator. The demodulator also comprises a power-on reset circuit 308.

Figure 10:
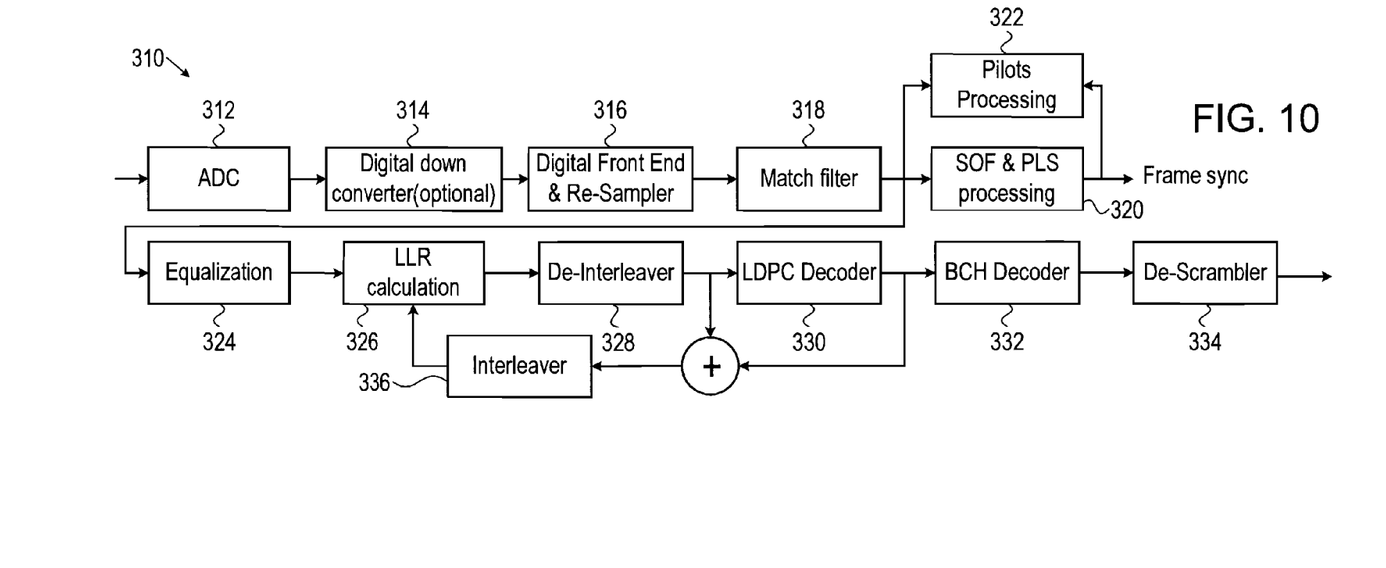

FIG. 10 is a block diagram that schematically illustrates functional blocks of a demodulator 310, in accordance with an embodiment of the present invention. The functional flow of FIG. 10 can be implemented, for example, using the hardware configuration of FIG. 9 above. The configuration of FIG. 10 can be used, for example, to demodulate the signals produced by modulator 230 of FIG. 8 above.

In demodulator 310, an ADC 312 digitizes the received signal after analog down-conversion. In some embodiments, the ADC produces a digital IF signal, and a digital down-converter 314 down-converts the digitized signal to baseband. In alternative embodiments, digital down-converter 314 can be omitted. A digital front-end and re-sampler 316 re-samples the digitized signal. The signal is then filtered by a matched filter 318, which matches the modulation pulse shape being used. A SOF&PLS processing module 320 and a pilot processing block 322 process the header and the pilot symbols transmitted in the signal so as to synchronize with the frames of the air interface. (SOF and PLS denote specific fields of the header.)

An equalizer 324 equalizes the signal. An LLR calculation module 326 computes LLRs of the potentially received bits. A de-interleaver 328 de-interleaves the LLRs, and an LDPC decoder 330 decodes the LDPC code applied by encoder 248 of FIG. 8 above. In the present example, the output of LDPC decoder 330 is used for updating the LLRs produced by LLR module 326, in an adaptive manner. In the present example, the output of decoder 330 is combined with the respective input LLRs, interleaved using an interleaver 336, and used to control module 326. A BCH decoder 332 decodes the BCH code applied by encoder 246 of FIG. 8 above. A descrambler 334 descrambles the bit stream. The descrambled bit stream is provided as output of the demodulator.

The configurations shown in FIGS. 1-5 and 7-10 are example configurations, which are chosen purely for the sake of conceptual clarity. In alternative embodiments, any other suitable configuration can also be used. For example, the modulator of FIG. 7 and the demodulator of FIG. 9 may have any other number and/or type of input and output interfaces. Some elements that are not mandatory for explanation of the disclosed techniques were omitted from the figures for the sake of clarity.

Some elements of the various system, front-end, modulator and demodulator configurations described herein can be implemented using hardware, such as in one or more ASICs and/or one or more FPGAs. Additionally or alternatively, some system, front-end, modulator and/or demodulator elements can be implemented in software running on a suitable processor, or using a combination of hardware and software elements.

When implementing a certain system, front-end, modulator or demodulator element on a processor, the processor typically comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although most of the embodiments described herein mainly address satellite communication, the methods and systems described herein can also be used in other communication applications, such as in terrestrial communication systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication method, comprising:
operating a communication unit, which demodulates radio signals in accordance with a first air interface and applies at least one upper-layer process to the demodulated signals;
receiving and demodulating a signal in accordance with a second air interface, different from the first air interface; and
inputting the demodulated signal to the communication unit so as to cause the communication unit to apply the upper-layer process to the signal that was demodulated using the second air interface while superseding the first air interface,
wherein the first air interface has a first performance, wherein the second air interface has a second performance that is better than the first performance, and wherein the first and second performance comprise at least one performance type selected from a group of types consisting of a spectral efficiency, an error rate and a link budget.

2. The method according to claim 1, wherein the communication unit includes a digital interface, which inputs digital signals for application of the upper-layer process, and wherein inputting the demodulated signal comprises sending the demodulated signal to the communication unit over the digital interface, while bypassing demodulation in accordance with the first air interface by the communication unit.

3. The method according to claim 1, wherein inputting the demodulated signal comprises re-modulating the demodulated signal using the first air interface, and providing the re-modulated signal to the communication unit.

4. The method according to claim 1, wherein the communication unit processes data in a transmission upper-layer process and modulates the processed data in accordance with the first air interface, and comprising receiving the processed data from the communication unit, and modulating the processed data in accordance with the second air interface while superseding the first air interface.

5. The method according to claim 4, wherein the communication unit includes a digital interface, which outputs digital signals after application of the transmission upper-layer process, and wherein receiving the processed data from the communication unit comprises receiving the processed data over the digital interface.

6. The method according to claim 4, wherein superseding the first air interface comprises demodulating the modulated and processed data, which is received from the communication unit, in accordance with the first air interface prior to modulation in accordance with the second air interface.

7. The method according to claim 4, and comprising transmitting the processed and modulated data in accordance with the second air interface to a satellite.

8. The method according to claim 1, wherein the upper-layer process comprises video decoding.

9. The method according to claim 1, wherein the upper-layer process comprises a Medium Access Control (MAC) process.

10. The method according to claim 1, wherein the upper-layer process comprises a Internet Protocol (IP) stack process.

11. The method according to claim 1, wherein receiving the signal comprises receiving the signal from a satellite.

12. The method according to claim 1, wherein operating the communication unit comprises operating multiple communication units in parallel, and wherein inputting the demodulated signal comprises providing the demodulated signal to the multiple communication units.

13. A communication method, comprising:
operating a communication unit, which demodulates radio signals in accordance with a first air interface and applies at least one upper-layer process to the demodulated signals;
receiving and demodulating a signal in accordance with a second air interface, different from the first air interface; and
inputting the demodulated signal to the communication unit so as to cause the communication unit to apply the upper-layer process to the signal that was demodulated using the second air interface while superseding the first air interface, wherein the second air interface defines transmission of symbols, which are shaped using a given pulse shape, at a symbol rate that is higher than a Nyquist rate defined for the given pulse shape.

14. A communication method, comprising:
operating a communication unit, which demodulates radio signals in accordance with a first air interface and applies at least one upper-layer process to the demodulated signals;
receiving and demodulating a signal in accordance with a second air interface, different from the first air interface; and
inputting the demodulated signal to the communication unit so as to cause the communication unit to apply the upper-layer process to the signal that was demodulated using the second air interface while superseding the first air interface,
wherein the second air interface defines encoding of data using a Low Density Parity Check (LDPC) code, and decoding of the LDPC code in an iterative process that applies internal iterations for computing output metrics based on input metrics, and external iterations that modify the input metrics based on the output metrics.

15. A communication apparatus, comprising:
an interface for connecting to a communication unit, which demodulates radio signals in accordance with a first air interface and applies at least one upper-layer process to the demodulated signals; and
front-end circuitry, which is configured to receive and demodulate a signal in accordance with a second air interface, different from the first air interface, and to input the demodulated signal to the communication unit via the interface so as to cause the communication unit to apply the upper-layer process to the signal that was demodulated using the second air interface while superseding the first air interface,
wherein the first air interface has a first performance, wherein the second air interface has a second performance that is better than the first performance, and wherein the first and second performance comprise at least one performance type selected from a group of types consisting of a spectral efficiency, an error rate and a link budget.

16. The apparatus according to claim 15, wherein the communication unit includes a digital interface, which inputs digital signals for application of the upper-layer process, wherein the interface connects to the communication unit via the digital interface and wherein the front-end circuitry is configured to send the demodulated signal to the communication unit over the digital interface, while bypassing demodulation in accordance with the first air interface by the communication unit.

17. The apparatus according to claim 15, wherein the front-end circuitry is configured to re-modulate the demodulated signal using the first air interface, and to provide the re-modulated signal to the communication unit.

18. The apparatus according to claim 15, wherein the communication unit processes data in a transmission upper-layer process and modulates the processed data in accordance with the first air interface, wherein the interface is further configured to receive the processed data from the communication unit, and wherein the front-end circuitry is further configured to modulate the processed data in accordance with the second air interface while superseding the first air interface.

19. The apparatus according to claim 18, wherein the communication unit includes a digital interface, which outputs digital signals after application of the transmission upper-layer process, and wherein the interface is configured to receive the processed data from the communication unit over the digital interface.

20. The apparatus according to claim 18, wherein the front-end circuitry is configured to supersede the first air interface by demodulating the modulated and processed data, which is received from the communication unit, in accordance with the first air interface prior to modulation in accordance with the second air interface.

21. The apparatus according to claim 18, wherein the front-end circuitry is configured to transmit the processed and modulated data in accordance with the second air interface to a satellite.

22. The apparatus according to claim 15, wherein the upper-layer process comprises video decoding.

23. The apparatus according to claim 15, wherein the upper-layer process comprises a Medium Access Control (MAC) process.

24. The apparatus according to claim 15, wherein the upper-layer process comprises a Internet Protocol (IP) stack process.

25. The apparatus according to claim 15, wherein the front-end circuitry is configured to receive the signal from a satellite.

26. The apparatus according to claim 15, wherein the interface is configured to connect to multiple communication units in parallel, and wherein the front-end circuitry is configured to input the demodulated signal to the multiple communication units.

27. A communication apparatus, comprising:
an interface for connecting to a communication unit, which demodulates radio signals in accordance with a first air interface and applies at least one upper-layer process to the demodulated signals; and
front-end circuitry, which is configured to receive and demodulate a signal in accordance with a second air interface, different from the first air interface, and to input the demodulated signal to the communication unit via the interface so as to cause the communication unit to apply the upper-layer process to the signal that was demodulated using the second air interface while superseding the first air interface,
wherein the second air interface defines transmission of symbols, which are shaped using a given pulse shape, at a symbol rate that is higher than a Nyquist rate defined for the given pulse shape.

28. A communication apparatus, comprising:
an interface for connecting to a communication unit, which demodulates radio signals in accordance with a first air interface and applies at least one upper-layer process to the demodulated signals; and
front-end circuitry, which is configured to receive and demodulate a signal in accordance with a second air interface, different from the first air interface, and to input the demodulated signal to the communication unit via the interface so as to cause the communication unit to apply the upper-layer process to the signal that was demodulated using the second air interface while superseding the first air interface,
wherein the second air interface defines encoding of data using a Low Density Parity Check (LDPC) code, and decoding of the LDPC code in an iterative process that applies internal iterations for computing output metrics based on input metrics, and external iterations that modify the input metrics based on the output metrics.

* * * * *